United States Patent
Ritchie et al.

(10) Patent No.: US 6,712,426 B2
(45) Date of Patent: Mar. 30, 2004

(54) MOTOR VEHICLE FRONT END STRUCTURE

(75) Inventors: Paul S. Ritchie, Troy, MI (US); Maxel Szwaj, Troy, MI (US)

(73) Assignee: Textron Automotive Company, Inc., Troy, MI (US)

( * ) Notice: Subject to any disclaimer, the term of this patent is extended or adjusted under 35 U.S.C. 154(b) by 54 days.

(21) Appl. No.: 09/981,168

(22) Filed: Oct. 17, 2001

(65) Prior Publication Data

US 2003/0107241 A1 Jun. 12, 2003

(51) Int. Cl.$^7$ ................................................ B60J 7/00
(52) U.S. Cl. .................... 296/188; 296/189; 296/194
(58) Field of Search ......................... 296/188, 189, 296/194, 203.01, 29, 187, 203.02

(56) References Cited

U.S. PATENT DOCUMENTS

| | | | | |
|---|---|---|---|---|
| 3,819,224 A | * | 6/1974 | Casey et al. ................. | 296/188 |
| 4,428,599 A | * | 1/1984 | Jahnle ......................... | 296/189 |
| 4,440,435 A | * | 4/1984 | Norlin ......................... | 296/188 |
| 4,573,734 A | * | 3/1986 | Gass ........................... | 296/189 |
| 4,601,510 A | * | 7/1986 | Schoppel et al. ........... | 296/194 |
| 4,750,780 A | * | 6/1988 | Harasaki et al. ............ | 296/194 |
| 4,763,948 A | * | 8/1988 | Harasaki ..................... | 296/188 |
| 5,201,566 A | * | 4/1993 | Mori ........................... | 296/192 |
| 5,271,473 A | * | 12/1993 | Ikeda et al. ................. | 296/194 |
| 5,303,973 A | * | 4/1994 | Fujii ........................... | 296/194 |
| 5,348,114 A | * | 9/1994 | Yamauchi ................. | 296/203.02 |
| 5,364,158 A | * | 11/1994 | Watanabe et al. ........... | 296/188 |
| D360,606 S | | 7/1995 | Holmes et al. .............. | D12/91 |
| 5,573,299 A | | 11/1996 | Masuda ...................... | 296/194 |
| 5,658,041 A | | 8/1997 | Girardot et al. ............ | 296/194 |
| 6,068,330 A | * | 5/2000 | Kasuga et al. .............. | 296/188 |
| 6,139,092 A | | 10/2000 | Doner et al. ................ | 296/189 |
| 6,139,093 A | | 10/2000 | Elliott et al. ............. | 296/203.02 |
| 6,155,633 A | | 12/2000 | Minami et al. ............. | 296/194 |
| 6,199,924 B1 | | 3/2001 | Oguri et al. ................ | 293/142 |
| 6,205,638 B1 | | 3/2001 | Yustick ....................... | 29/464 |
| 6,220,655 B1 | * | 4/2001 | Gure et al. ................. | 296/189 |
| 6,227,321 B1 | * | 5/2001 | Frascaroli et al. .......... | 296/194 |
| 6,250,710 B1 | * | 6/2001 | Matsuzaki ................... | 296/188 |
| 6,293,615 B1 | * | 9/2001 | Tarahomi .................... | 296/194 |
| 6,299,237 B1 | * | 10/2001 | Benz et al. ................. | 296/188 |
| 6,357,821 B1 | * | 3/2002 | Maj et al. ................... | 296/194 |
| 6,375,252 B1 | * | 4/2002 | Cheron et al. .............. | 296/194 |
| 6,409,255 B2 | * | 6/2002 | Tilsner et al. ............... | 296/194 |
| 6,502,653 B1 | * | 1/2003 | Balzer et al. ............... | 296/194 |
| 6,502,659 B2 | * | 1/2003 | Akasaka ..................... | 180/309 |
| 2002/0093221 A1 | * | 7/2002 | Forssell et al. ............. | 296/188 |

FOREIGN PATENT DOCUMENTS

| | | | |
|---|---|---|---|
| DE | 42 09 879 | * | 10/1992 |
| EP | 0 990 577 | * | 4/2000 |
| EP | 1 232 931 | * | 8/2002 |
| GB | 2 153 751 | * | 8/1985 |
| JP | 3 148385 | * | 6/1991 |

OTHER PUBLICATIONS

Cheron, H. et al., "Front End Architecture: Innovative Approach to Meet Customer Needs", SAE Technical Paper Series 2000–01–1079, pps 1–8.

* cited by examiner

*Primary Examiner*—Kiran Patel
(74) *Attorney, Agent, or Firm*—Grossman, Tucker, Perreault & Pfleger, PLLC

(57) ABSTRACT

A front structure for a motor vehicle comprising a front support connected to a vehicle frame member at a first connection location and to an engine support structure at a second connection location. Upon impact of the front structure of the motor vehicle with another object, the front support transfers energy from the impact to the first connection location, thereby reducing energy transferred to the support members.

8 Claims, 7 Drawing Sheets

US 6,712,426 B2

MOTOR VEHICLE FRONT END STRUCTURE

FIELD OF THE INVENTION

The present invention relates generally to chassis structures for motor vehicles. More particularly, the present invention relates to front structures for motor vehicles.

BACKGROUND OF THE INVENTION

Motor vehicles typically comprise one of two different chassis constructions. More traditionally, the chassis of a motor vehicle has involved providing a body-on-frame construction. In other words, the motor vehicle body and frame comprise separate assemblies which are then connected. More recently, so called "unibody" constructions have developed in which the side rails are integral components of the floor pan.

For both body-on-frame and unibody chassis constructions, lower frame rails provide a substantial portion of the energy management structure in response to a frontal collision. However, in doing so, the lower frame rails are more prone to bend and undergo serious damage as a result of a major frontal collision, thus raising the possibility of the vehicle having to be scrapped and replaced, as compared to a vehicle front structure configured to distribute impact energy and force to other portions of the vehicle chassis other than the lower frame rails.

It would be desirable to overcome the aforementioned difficulties by providing a front vehicle structure which transfers a portion of the impact energy and force associated with a frontal collision into a vehicle structure other than the lower frame rails, where it can be absorbed and dissipated, thus reducing the forces placed on the lower frame rails and the corresponding likelihood of unrepairable damage.

SUMMARY OF THE INVENTION

The present invention provides an improvement over conventional motor vehicles by providing a front structure that transfers a portion of the impact energy associated with a frontal collision into a vehicle structure other than the lower frame rails, particularly to the wheel house assembly of the engine compartment, for example, at the upper rail, shock absorber (e.g. strut, shock) tower or apron.

According to one aspect of the invention, a front structure for a motor vehicle is provided comprising at least one support assembly, the support assembly connected to an engine support structure at a first connection location and to a wheel house assembly at a second connection location; and wherein, upon impact of the front structure of the motor vehicle with another object, the support assembly transfers energy from the impact to the wheel house assembly, and to the engine support member.

According to another aspect of the invention, the support assembly comprises an upper support member, a lower support member, and an intermediate support member; and the upper support member and lower support member are connected to the intermediate support member at a front side of the engine compartment, the upper support member and lower support member thereafter extending towards the rear of the motor vehicle in converging relationship towards the second connection location.

According to another aspect of the invention, the upper support member, the lower support member, and the intermediate support member are integrally formed.

According to another aspect of the invention, the upper support member, the lower support member, and the intermediate support member form a triangular structure.

According to another aspect of the invention, the engine support structure comprises a frame rail.

According to another aspect of the invention, the first connection location comprises a portion of the frame rail.

According to another aspect of the invention, the wheel house structure comprises a shock absorber tower.

According to another aspect of the invention, the second connection location comprises a portion of the shock absorber tower.

According to another aspect of the invention, upon impact of the front structure of the motor vehicle, a majority of the impact energy is transferred to the wheel house assembly, and a minority is transferred to an engine support structure.

BRIEF DESCRIPTION OF THE DRAWINGS

These and other objects, features and advantages of the invention will become apparent upon consideration of the description of the invention and the appended drawings in which.

The above and other objects, feature, and advantages of the present invention will be apparent in the following detailed description thereof when read in conjunction with the appended drawings wherein the same reference characters denote the same or similar parts throughout the several views.

DESCRIPTION OF THE INVENTION

Figure 1:
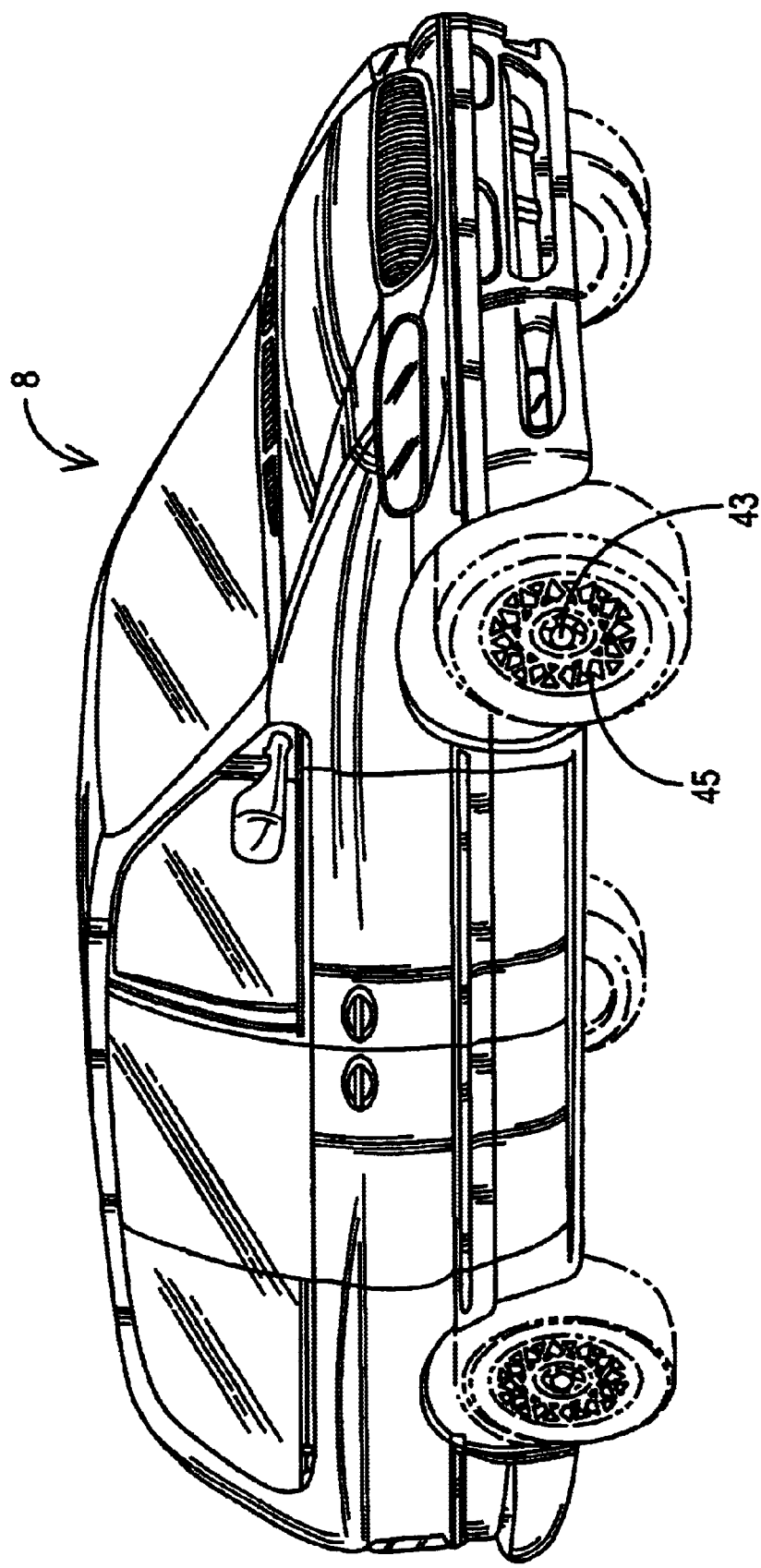
FIG. 1 is a representative perspective view of a motor vehicle which may incorporate the front structure in accordance with the present invention.

Referring now to FIG. 1, a motor vehicle in accordance with the present invention is shown at reference character 8. As shown, motor vehicle 8 comprises a minivan. However, in other embodiments, motor vehicle may include, but is not limited to, automobiles, light-trucks, sport utility vehicles, and all purpose vehicles.

Referring now to FIGS. 2–6, a novel front structure of motor vehicle 8 is shown at reference character 10. The front structure 10 includes a right-side support assembly 12 and left-side support assembly 14. For clarity, the "right-side" and "left-side" of the vehicle 10 are made relative to a seated driver in vehicle 10.

Figure 7:
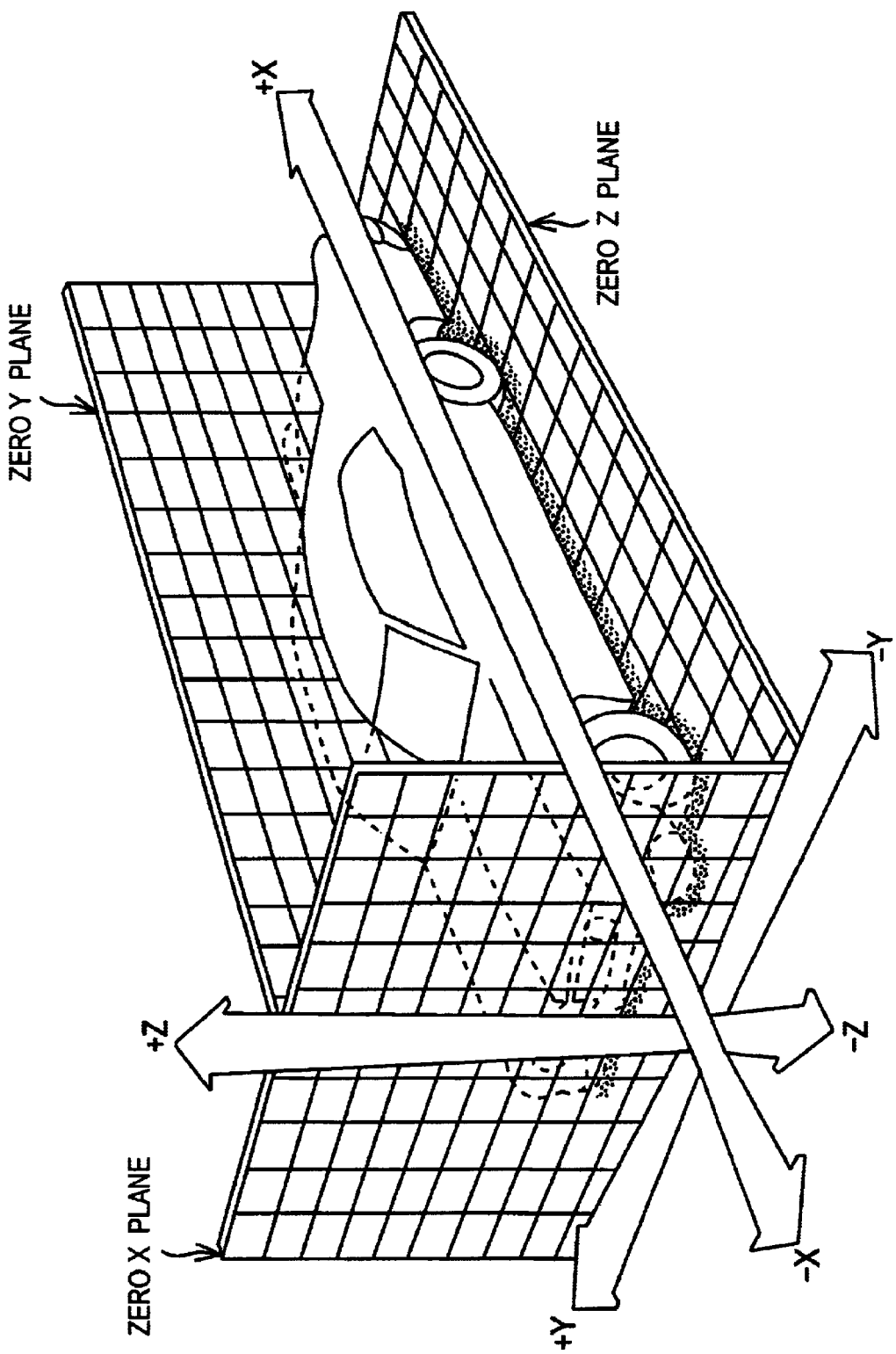
FIG. 7 is representative perspective view of an X, Y, Z annex for a motor vehicle in accordance with the present invention.

Right-side support assembly 12 comprises a substantially horizontal (relative to the X-plane of FIG. 7) arcuate upper support member 16, a substantially linear vertical (relative to the Z-plane of FIG. 7) intermediate support member 18, and a substantially linear diagonal (relative to the X and Z-planes of FIG. 7) lower support member 20. Correspondingly, left-side support assembly 14 comprises a substantially horizontal arcuate upper support member 26, a substantially linear vertical intermediate support member 28, and a substantially linear lower support member 30.

Member 16, 18, and 20 of right-side support assembly 12, as well as members 26, 28 and 30 of left-side support assembly 14, are preferably formed integral with one another from plastic, and more particularly thermoplastic, using injection molding. However, alternatively, members 16, 18, 20 of right-side support assembly 12 and members 26, 28 and 30 of left-side support assembly 14 may be separately formed and thereafter connected by separate connectors, adhesives or via welding techniques.

Figure 3:
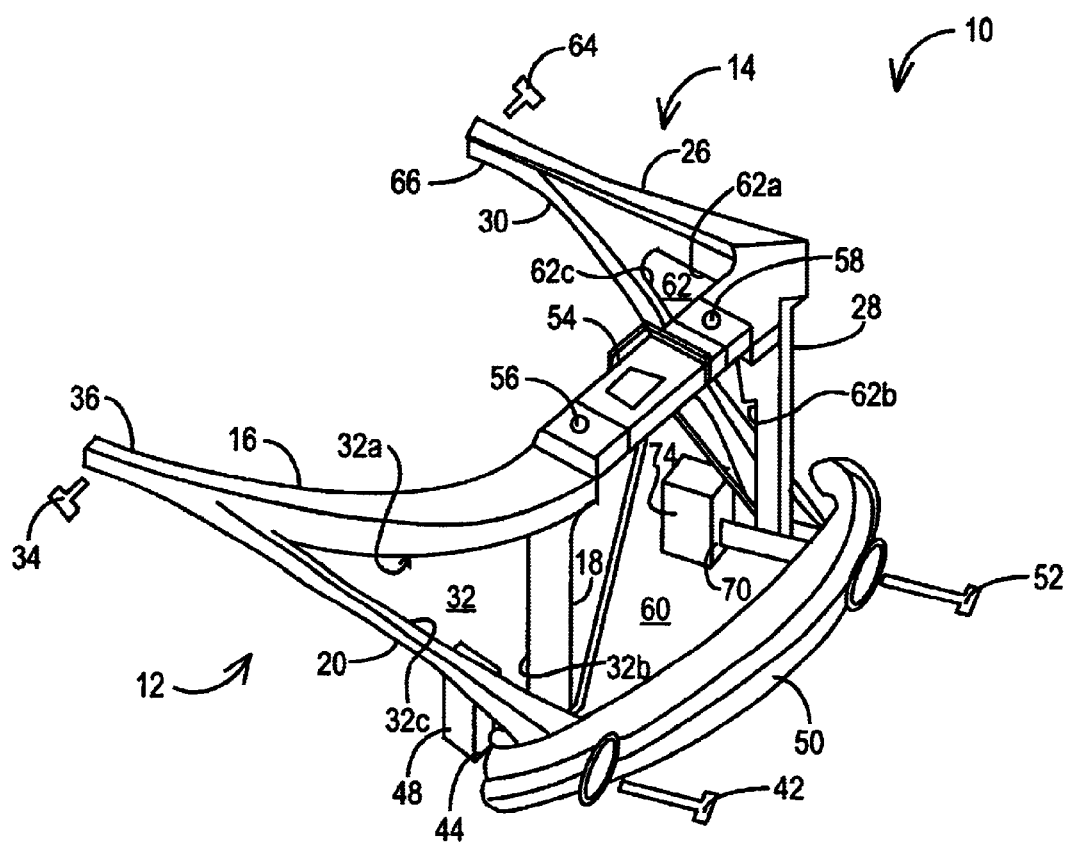
FIG. 3 is a representative perspective view of a front structure for a motor vehicle in accordance with the present invention.
Figure 4:
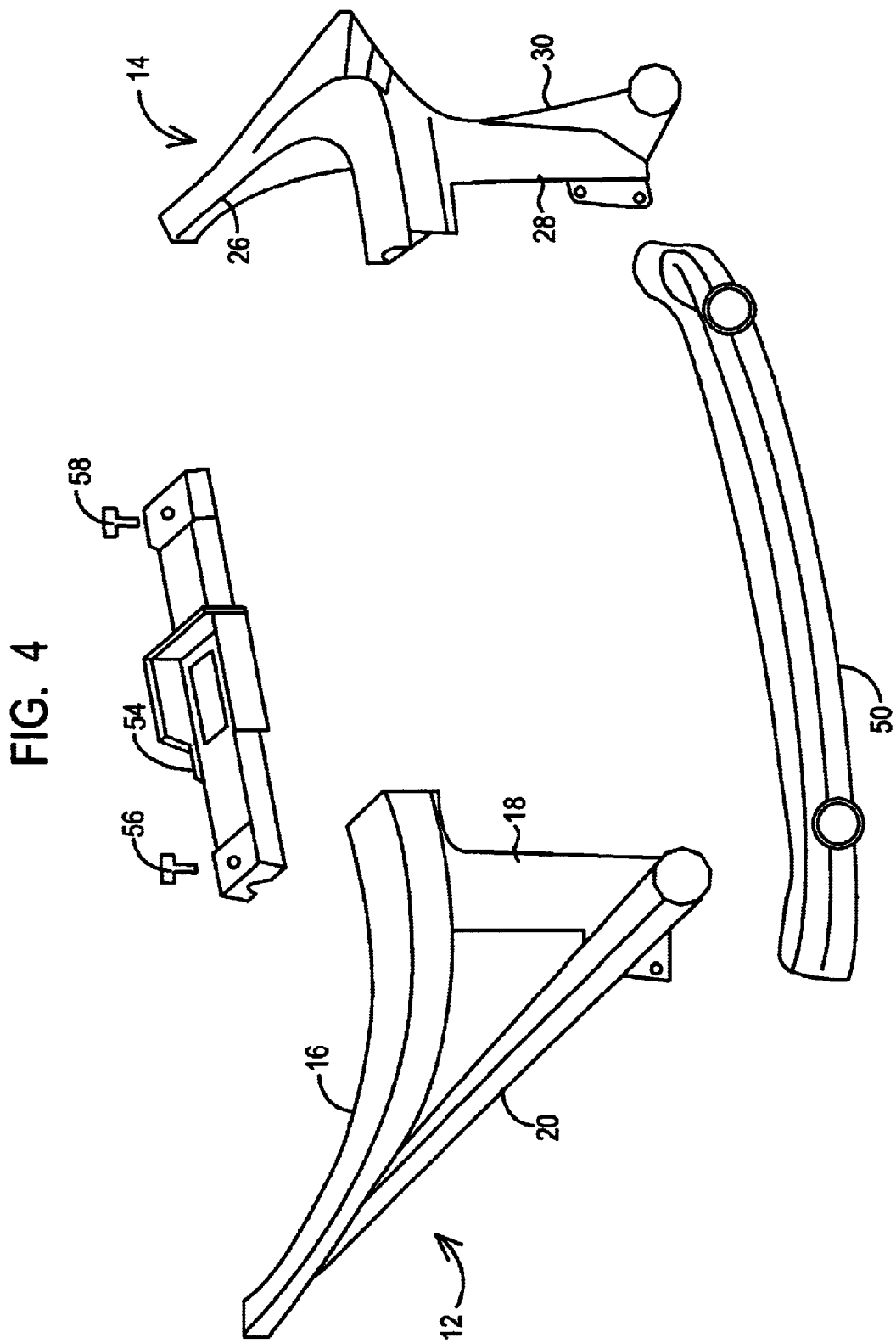
FIG. 4 is a representative perspective view of the front structure of FIG. 3 unassembled.

Upper support member 16, forward support member 18 and lower support member 20 are preferably arranged geometrically to form a triangular structure. As shown in FIG. 3, sides 32*a–c* of support members 16, 18 and 20, respectively, form a triangular aperture 32.

Figure 2:
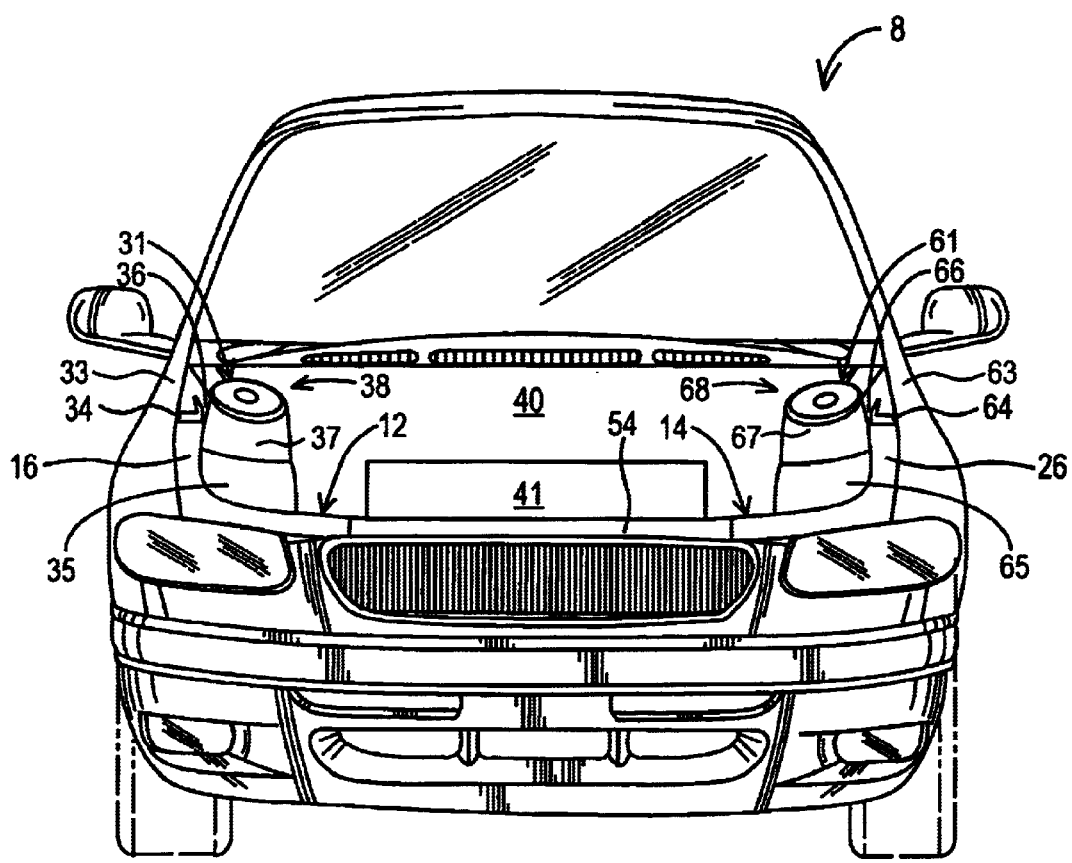
FIG. 2 is a representative front view of the motor vehicle of FIG. 1 with the hood for the engine compartment removed.

As shown in FIG. 3, upper support member 16 and lower support member 20 of right-side support assembly 12 preferably converge on one another as they progress rearward in vehicle (i.e. from the front of the vehicle towards the rear of the vehicle). As best shown in FIGS. 2 and 3, right-side support assembly 12 connects to the motor vehicle 8 preferably by at least one connector 34 at a connection location 36 located on the wheel house assembly 31 along the upper rear right-side 38 of the engine compartment 40. As shown, wheel house assembly 38 comprises upper rail 33, apron 35 and shock absorber (e.g. strut, shock) tower 37. Thus, as shown, connection location 36 may comprise, but is not limited to, a portion of upper rail 33, apron 35 and shock absorber tower 37. As shown in FIG. 2, preferably connection location 36 comprises the outer side wall of a circular shock tower 37.

Connector 34 preferably comprises a threaded fastener and preferably connects right-side support assembly 12 to the upper rear right-side 38 of the engine compartment 40 through the Y-plane. In this manner, connector 34 may function as a shear pin in response to a frontal collision. In other embodiments, connector 34 may comprise other types of mechanical fasteners or may constitute an adhesive.

For the purposes of clarity, as used in this specification, "rear" of the engine compartment means that portion of the engine compartment 40 and surrounding structure rearward (in vehicle) of at least a portion of the engine block 41 of the motor vehicle 8 in the X-direction and, more preferably, rearward of the front axle 43 in the X-direction of the motor vehicle. Also, as used in this specification, "upper" of the engine compartment means that portion of the engine compartment and surrounding structure above the front axel 43 of the motor vehicle 8 in the Z direction and, more preferably, above the wheel 45 (i.e. rim with tire) of the motor vehicle 8 in the Z-direction. Also, as used in this specification, "side" of the engine compartment means that portion of the engine compartment left or right of the zero Y-plane and, more preferably outboard of at least a portion of the engine block 41.

As shown in FIG. 3, upper support member 16 and lower support member 20 of right-side support assembly 12 preferably diverge as they progress forward in vehicle (i.e. from the rear of the vehicle towards the front of the vehicle) and, at their forward most location in vehicle, are separated by the length of forward support member 18.

Right-side support assembly 12 is also connected to the motor vehicle 8 preferably by at least one connector 42 at a connection location located along the front right-side of the engine compartment 40. Connection location 44 may comprise, but is not limited to, a portion of the engine 41 support structure (i.e. structure which supports the weight of the engine) such as, but not limited to, a portion of the lower right frame rail (preferably the forward end), an engine cradle or a cross-member. As shown in FIG. 3, preferably connection location 44 comprises a frame rail 48. Connector 42 preferably comprises a threaded fastener and preferably connects right-side support assembly 12 to a frame rail 48 through the X-plane.

In addition to connecting right-side support assembly 12 to vehicle 8, connector 42 also preferably connects bumper beam 50 to right-side support assembly 12. Similarly, in addition to connector 52 connecting left-side support assembly 14 to vehicle 8, connector 52 also preferably connects bumper beam 50 to left-side support assembly 14.

In addition to functioning as a bumper beam 50, beam 50 also functions as a lower cross-member relative to left-side support assembly 12 and right-side support assembly 14. In this manner, beam 50 increases the lateral (i.e. side to side) rigidity of front structure 10.

Turning to upper support members 16, 26 of right-side and left-side support assemblies 12, 14, respectively, preferably, the upper support member 16 of right-side support assembly 12 and upper support member 26 of left-side support assembly 14 are connected by an upper cross-member 54 connected to each by connectors 56, 58.

Figure 5:
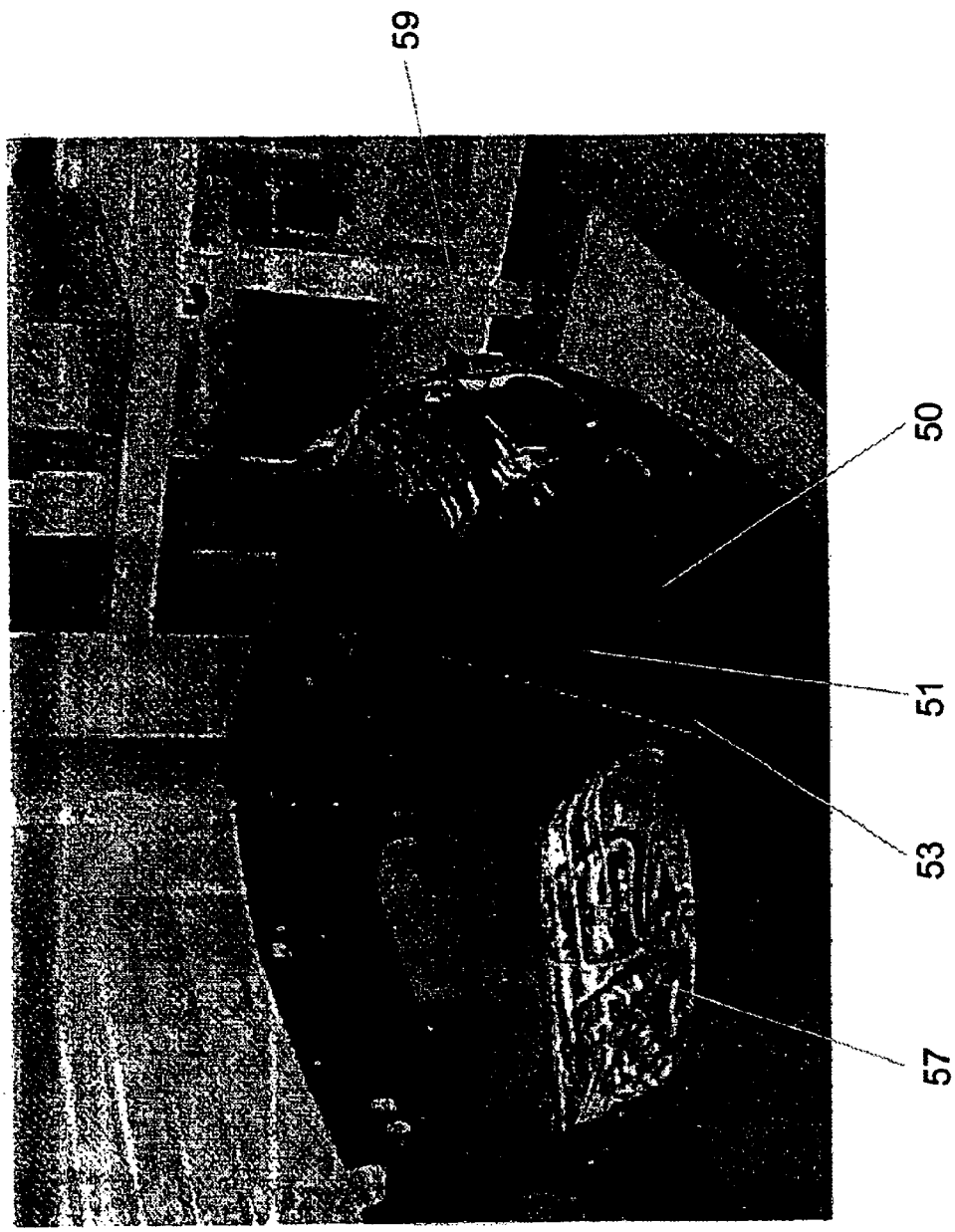
FIG. 5 is a representative perspective view of the front structure of FIG. 3 incorporating additional components including a radiator, condenser, headlamps, and fascia.
Figure 6:
FIG. 6 is a representative perspective view of the front structure of FIG. 3 incorporating additional components including an airbox, fan assembly, and battery tray.

In this above manner, right-side support assembly 12, left-side support assembly 14, beam 50, and upper cross-member 54 form a box structure with a center aperture 60 formed there between as shown in FIG. 3. As shown in FIGS. 5 and 6, aperture 60 may be used to incorporate components of the vehicle's HVAC (heating, ventilation, air-conditioning) system such as a radiator 51, condenser 53 and fan assembly 55 (e.g. fan, fan motor, fan schroud, etc.).

Similar to right-side support assembly 12, upper support member 26, forward support member 28 and lower support member 30 of left-side support assembly 14 also are preferably arranged geometrically to form a triangular structure. As shown in FIG. 3, sides 62*a–c* of support members 26, 28 and 30, respectively, form a triangular aperture 62.

As shown in FIG. 3, upper support member 26 and lower support member 30 of left-side support assembly 14 also preferably converge on one another as they progress rearward in vehicle (i.e. from the front of the vehicle towards the rear of the vehicle). As best shown in FIGS. 2 and 3, left-side support assembly 14 is connected to the motor vehicle 8 preferably by at least one connector 64 at a connection location 66 located on the wheel house assembly 61 along the upper rear left-side 68 of the engine compartment 40. As shown, wheel house assembly 61 comprises upper rail 63, apron 65, and shock absorber (e.g. strut, shock) tower 67. Thus, as shown, connection location 66 may comprise, but is not limited to, a portion of the upper rail 63, apron 65 and shock absorber tower 67. As shown in FIG. 2, preferably connection location 66 comprises the outer side wall of a circular shock tower 67.

Connector 64 preferably comprises a threaded fastener and preferably connects left-side support assembly 14 to the upper rear left-side 68 of the engine compartment 40 through the Y-plane. In this manner, connector 64 may function as a shear pin in response to a frontal collision. In other embodiments, connector 64 may comprise other types of mechanical fasteners or may constitute an adhesive.

Similar to right-side support assembly 12, upper support member 26 and lower support member 30 of left-side support assembly 14 preferably diverge as they progress forward in vehicle (i.e. from the rear of the vehicle towards the front of the vehicle) and, at their forward most location in vehicle, are separated by the length of forward support member 28.

Left-side support assembly 14 is also connected to the motor vehicle 8 preferably by at least one connector 52 at a connection location 70 located along the front right-side of the engine compartment 40. Connection location 70 may comprise, but is not limited to, a portion of the engine 41 support structure such as, but not limited to, a portion of the lower left frame rail (preferably the forward end), an engine cradle or a cross-member. As shown in FIG. 3, preferably connection location 70 comprises a frame rail 74. Connector 52 preferably comprises a threaded fastener and preferably connects left-side support assembly 14 to a frame rail 74 through the X-plane.

In the above manner, connectors 34, 42 and connectors 64, 52 connect right-side support assembly 12 and left-side support assembly 14, respectively, to the vehicle 8 in two different planes. This leads to improved crash worthiness of the vehicle in 7/20/40 mph impact performance. In addition it reduces front end lateral shake, is of lightweight design, and provides superior attachment and front end integrity.

As alluded to above, right-side support assembly 12, left-side support assembly 14 and upper cross-member 54 may be made formed integral with one another from plastic, and more particularly engineering thermoplastics, using injection molding. Such engineering thermoplastics may include, but not be limited to, nylons, polyestors, polycarbonate, polysulphones, polycarbonate/ABS blends, etc.

Furthermore, in other embodiments, beam 50 may also be made integral with right-side support assembly 12, left-side support assembly 14 and upper cross-member 54. In still other embodiments, right-side support assembly 12 and left-side support assembly 14 may also comprise a lamp housing 57 and/or lamp washer 59 attached thereto or formed integral therewith. Also, in other embodiments right-side support assembly 12 and left-side support assembly 14 may also include an outer body panel, such as a fender or fascia attached thereto or formed integral therewith.

With respect to operation of front structure 10, in response to a frontal impact of beam 50, impact energy and force is first preferably transmitted from beam 50 to lower support members 20, 30. From lower support members 20, 30, the impact energy and force is then transmitted to the wheel house assembly 31 at the upper rear right-side 38 and the wheel house assembly 61 at the upper rear left-side 68 of the engine compartment 40 where it is absorbed and dissipated. Simultaneously, impact energy and force is also preferably transmitted from lower support members 20, 30 into frame rails 48, 74 where it is absorbed and dissipated. Thus, the impact energy and force transmitted to the upper rear right-side 38 and upper rear left-side 68 of the engine compartment 40 reduces the energy and force ordinarily transmitted into the frame rails 48, 74 as compared to the situation where no energy and force is transmitted to the upper rear right-side 38 and upper rear left-side 68 of the engine compartment 40 and all the energy and force is transmitted to the frame rails 48, 74.

Therefore, in accordance with the present invention, front structure 10 may be configured to, e.g., selectively transfer impact energy to wheel house assemblies 31 and 61 to a larger extent (>50%) than to rails 48 and 74. Accordingly, front structure 10 herein provides the unique ability to regulate and direct the impact energy as between wheel house assemblies 31 and 61 and rails 48 and 74 as a consequence of its design and positioning in the vehicle, which can be readily adjusted.

In other embodiments, vehicle 8 may only have a single right-side support assembly 12 or left-side support assembly 14. Also, in other embodiments, right-side support assembly 12 or left-side support assembly 14 may comprise mirror images of one another.

The description and drawings illustratively set forth our presently preferred invention embodiments. We intend the description and drawings to describe these embodiments and not to limit the scope of the invention. Those skilled in the art will appreciate that still other modifications and variations of the present invention are possible in light of the above teaching while remaining within the scope of the following claims. Therefore, within the scope of the claims, one may practice the invention otherwise than as the description and drawings specifically show and describe.

We claim:

1. A front structure for a motor vehicle, the front structure comprising:

at least one support assembly, the support assembly connected to an engine support structure at a first connection location and to a wheel house assembly at a second connection location wherein the support assembly comprises an upper support member, a lower support member, and an intermediate support member; and the upper support member and lower support member are connected to the intermediate support member at a front side of the engine compartment, the upper support member and lower support member thereafter extending towards the rear of the motor vehicle in converging relationship towards said second connection location; and wherein, upon impact of the front structure of the motor vehicle with another object, the support assembly transfers energy from the impact to the wheel house assembly and to the engine support member.

2. The front structure of claim 1 wherein:

the upper support member, the lower support member, and the intermediate support member are integrally formed.

3. The front structure of claim 1 wherein the upper support member, the lower support member, and the intermediate support member form a triangle structure.

4. The front structure of claim 1 wherein the engine support structure comprises a frame rail.

5. The front structure of claim 4 wherein the first connection location comprises a portion of the frame rail.

6. The front structure of claim 1 wherein the wheel house structure comprises a shock absorber tower.

7. The front structure of claim 6 wherein the second connection location comprises a portion of the shock absorber tower.

8. The front structure of claim 1 wherein upon impact of the front structure of the motor vehicle, the support assembly transfers a majority of said energy from the impact to the wheel house assembly and a minority to the engine support member.

* * * * *